United States Patent [19]

Segawa et al.

[11] Patent Number: 5,372,887
[45] Date of Patent: Dec. 13, 1994

[54] UV-RAY ABSORBING SANDWICH GLASS COMPRISING A SPECIFIC THERMOSETTING RESIN COMPOSITION

[75] Inventors: Masashi Segawa, Kodaira; Itsuo Tanuma, Sayama; Kazuo Naito, Kawasaki, all of Japan

[73] Assignee: Bridgestone Corporation, Tokyo, Japan

[21] Appl. No.: 17,343

[22] Filed: Feb. 2, 1993

Related U.S. Application Data

[63] Continuation of Ser. No. 764,081, Sep. 23, 1991, abandoned, which is a continuation of Ser. No. 515,310, Apr. 27, 1990, abandoned.

[30] Foreign Application Priority Data

May 1, 1989 [JP] Japan ................. 1-109107

[51] Int. Cl.$^5$ .............................. B32B 27/00
[52] U.S. Cl. ................... 428/409; 428/422; 428/429; 428/441; 428/447; 428/913
[58] Field of Search ............... 428/409, 422, 429, 441, 428/447, 522, 543, 913

[56] References Cited

U.S. PATENT DOCUMENTS

| | | | |
|---|---|---|---|
| 3,666,614 | 5/1972 | Snedeker et al. | 418/412 |
| 4,303,739 | 12/1981 | Beckman et al. | 428/429 |
| 4,317,862 | 3/1982 | Honda et al. | 428/442 |
| 4,511,627 | 4/1985 | Tanuma et al. | 428/429 |
| 4,600,627 | 7/1986 | Honda et al. | 428/203 |
| 4,636,408 | 1/1987 | Anthony et al. | 427/160 |
| 4,910,074 | 3/1990 | Fukawa et al. | 428/215 |

FOREIGN PATENT DOCUMENTS 0076709  4/1983  European Pat. Off. .
0227470  1/1987  European Pat. Off. .
2057355  1/1981  United Kingdom .

OTHER PUBLICATIONS

Patent Abstracts of Japan, vol. 7, No. 43 (C–152), 2nd Dec. 1982; & JP-A-57 196 747 (Bridgestone).
Communication dated Dec. 14, 1990.
European Search Report dated Nov. 23, 1990.

*Primary Examiner*—D. S. Nakarani
*Assistant Examiner*—H. Thi Le
*Attorney, Agent, or Firm*—Sughrue, Mion, Zinn, Macpeak & Seas

[57] ABSTRACT

A sandwich glass having high ultraviolet ray-absorbing ability is disclosed. This sandwich glass is produced by interposing a thermosetting resin between 2 glass plates to form a monolithic structure and thermosetting the resin layer, which thermosetting resin uses a benzophenone or benzotriazole series compound as an ultraviolet ray-absorbing agent in a thermosetting resin comprising an ethylene-vinyl acetate copolymer, an organic peroxide, an acryloxy group-, methacryloxy group- or allyl group-containing compound, a silane coupling agent and an ultraviolet ray-absorbing agent.

7 Claims, 1 Drawing Sheet

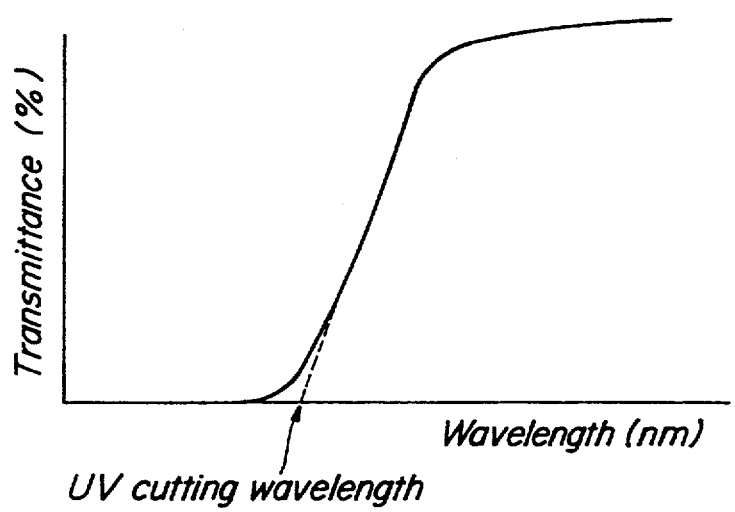
FIG_1

UV-RAY ABSORBING SANDWICH GLASS COMPRISING A SPECIFIC THERMOSETTING RESIN COMPOSITION

This is a continuation of application Ser. No. 07/764,081 filed Sep. 23, 1991 abandoned, which is a continuation of application Ser. No. 07/515,310 filed Apr. 27, 1990, now abandoned.

BACKGROUND OF THE INVENTION a) Field of the Invention

This invention relates to an ultraviolet ray-absorbing type sandwich glass to be used in the front glass of automobile, the window glass of architecture, and the like.

b) Related Art Statement

Polyvinylbutyral resin has hitherto been most commonly used as an intermediate layer of the sandwich glass of this kind. However, polyvinylbutyral resin is thermoplastic, and has several problems in its use as an intermediate layer of sandwich glass. That is, the sandwich glass having an intermediate layer formed of polyvinylbutyral resin has such problems that (1) polyvinylbutyral resin has a relatively low softening point, and hence sliding of glass plates or formation of bubbles occur due to the heat after the glass plates are stuck to the resin; (2) polyvinylbutyral resin is apt to be influenced by moisture, and hence when the resulting sandwich glass is left to stand for a long period of time under a high humidity atmosphere, the resin whitens from the peripheral portion of the sandwich glass, and deteriorates in its adhesive force to the glass; and further (3) the impact fracture resistance of the resin depends on temperature, and the penetration resistance of the sandwich glass decreases noticeably at a temperature higher than room temperature, that is, at a temperature higher than about 30° C.; and other problems.

The inventors have already disclosed a novel sandwich glass completely free from the above described drawbacks by the use of a thermosetting resin, which resin comprises an ethylene-vinyl acetate copolymer resin and an organic peroxide, as an intermediate layer of the sandwich glass in place of the conventional polyvinylbutyral resin (Japanese Patent Laid-open Application No. 57-196,747). However, although this sandwich glass has such several merits inherent to sandwich glass that an impacting substance is difficult to penetrate into the sandwich glass, and hence the sandwich glass has a high safeness, that the broken glass pieces are hardly scattered, and that the sandwich glass is useful for preventing a residence or building from being intruded by a thief or burglar, the sandwich glass is poor in the ability for preventing the burning of furniture, curtain, carpet, tatami (Japanese straw mat) and the like by the ultraviolet ray, which ability is demanded to sandwich glass corresponding to the grade up of building, residence, interior design and the like, that is, the sandwich glass is poor in the ultraviolet ray-absorbing ability, which serves to prevent the discoloration (yellowing) of furniture, curtain, carpet, tatami and the like and to protect the merchandise exhibited in a show window.

The ultraviolet ray-absorbing ability can be generally given to a resin by adding an ultraviolet ray-absorbing agent to the resin, but when an ultraviolet ray-absorbing agent is added to a thermosetting resin, which contains an organic peroxide and is required to have a high adhesion to glass and a high transparency same as that of glass, the resulting resin composition still has problems in the yellowing with the lapse of time due to the presence of the ultraviolet ray-absorbing agent contained therein and in the poor adhesion to glass.

The inventors have further made various investigations and found out that a benzophenone type or benzotriazole type ultraviolet ray-absorbing agent does not hinder the adhesion of a resin containing the agent to glass, and is very low in the yellowing with the lapse of time, and have accomplished the present invention.

SUMMARY OF THE INVENTION

The feature of the present invention lies in the provision of an ultraviolet ray-absorbing type sandwich glass, comprising two glass plates and a cured resin layer interposed between the glass plates, said sandwich glass having been produced by interposing a thermosetting resin between two glass plates to form a monolithic structure, and thermosetting the resin layer interposed between the glass plates, and said thermosetting resin comprising an ethylene-vinyl acetate copolymer, an organic peroxide, an acryloxy group-, methacryloxy group- or allyl group-containing compound, a silane coupling agent and an ultraviolet ray-absorbing agent.

BRIEF DESCRIPTION OF THE DRAWING

FIG. 1 shows an ultraviolet ray absorption spectrum of a sandwich glass produced in the Example in the specification of the present application, and illustrates how to determine the UV cutting wavelength of the sandwich glass.

DESCRIPTION OF THE PREFERRED EMBODIMENT

As the organic peroxide to be used as a curing agent of ethylene-vinyl acetate copolymer in the production of the sandwich glass of the present invention, there can be used any organic peroxides, which are decomposed at a temperature of not lower than 100° C. to form a radical. However, when the stability of the organic peroxide during its mixing with the copolymer is taken into consideration, organic peroxides having a 10 hour half-value period decomposition temperature of not lower than 70° C. are advantageously used. For example, there can be advantageously used 2,5-dimethylhexane-2,5-dihydroperoxide, 2,5-dimethyl-2,5-di-(t-butylperoxy)hexyne-3, di-t-butyl peroxide, t-butyl cumyl peroxide, 2,5-dimethyl-2,5-di-(t-butylperoxy) hexane, dicumyl peroxide, α,α'-bis(t-butylperoxyisopropyl)benzene, n-butyl-4,4-bis(t-butylperoxy) valerate, 2,2-bis(t-butylperoxy)butane, 1,1-bis(t-butylperoxy) cyclohexane, 1,1-bis(t-butylperoxy)-3,3,5-trimethylcyclohexane, t-butylperoxy benzoate, benzoyl peroxide and the like. As the organic peroxide, at least one member of these organic peroxides is used in an amount of 5 parts by weight or less based on 100 parts by weight of ethylene-vinyl acetate copolymer.

The content of vinyl acetate unit in the ethylene-vinyl acetate copolymer is preferably 15–50% by weight, and particularly preferably 19–40% by weight. When the content of vinyl acetate unit is less than 15% by weight, a resin layer having a satisfactorily high transparency can not be obtained by the crosslinking and curing of the thermosetting resin at a high temperature. While, when the content of the vinyl acetate unit is more than 50% by weight, the resulting resin layer has a satisfactorily high transparency, but the resin layer is low in the modulus, and even when an acrylic or methacrylic monomer explained later is added to the ethylene-vinyl acetate copolymer, a resin layer having a high penetration resistance can not be obtained.

There is a certain correlation between the penetration resistance of ethylene-vinyl acetate copolymer and the initial modulus thereof. One of the objects of the sandwich glass is to prevent the penetration of a small body through the sandwich glass in the case where the small body is collided to the sandwich glass. In the sandwich glass of the present invention, in order to enhance the penetration resistance of ethylene-vinyl acetate copolymer resin used as an intermediate layer by improving the initial modulus of the resin, an acryloxy group-, methacryloxy group- or allyl group-containing compound can be added to the ethylene-vinyl acetate copolymer resin. As the compound to be used in this object, there can be used most advantageously acrylic acid or methacrylic acid derivatives, for example, ester or amide of acrylic acid or methacrylic acid. As the alcohol residue of the ester, there can be mentioned alkyl groups, such as methyl group, ethyl group, dodecyl group, stearyl group, lauryl group and the like; cyclohexyl group, tetrahydrofurfuryl group, aminoethyl group, 2-hydroxyethyl group, 3-hydroxypropyl group, 3-chloro-2-hydroxypropyl group and the like. Further, as the ester of acrylic acid or methacrylic acid, there can be used esters of acrylic acid or methacrylic acid with a polyfunctional alcohol, such as ethylene glycol, triethylene glycol, polyethylene glycol or the like, as well. As the amide of acrylic acid or methacrylic acid, diacetone acryliamide is advantageously used. As the allyl group-containing compound, there can be advantageously used diallyl phthalate, triallyl isocyanurate, triallyl cyanurate and the like. The use amount of these compounds is 50% by weight or less based on the amount of the ethylene-vinyl acetate copolymer.

In order to further improve the adhesion of the ethylene-vinyl acetate copolymer resin to the glass, a silane coupling agent can be added to the ethylenevinyl acetate copolymer resin. As the silane coupling agent to be used for this purpose, there can be used commonly known silane coupling agents, for example, γ-chloropropylmethoxysilane, vinyl-trichlorosilane, vinyl-triethoxysilane, vinyl-tris(β-methoxyethoxy) silane, γ-methacryloxypropyl-trimethoxysilane, β-(3,4-ethoxycyclohexyl)ethyl-trimethoxysilane, γ-glycidoxypropyl-trimethoxysilane, vinyl-triacetoxysilane, γ-mercaptopropyl-trimethoxysilane, γ-aminopropyltrimethoxysilane, N-β-(aminoethyl)-γ-aminopropyltrimethoxysilane and the like. These silane coupling agents are used in an amount of 5 parts by weight or less based on 100 parts by weight of the ethylene-vinyl acetate copolymer.

As the ultraviolet ray absorbing agent to be used for giving an ultraviolet ray-absorbing ability to the ethylene-vinyl acetate copolymer resin of the present invention, commonly known ultraviolet ray-absorbing agents can be used in an amount of 5 parts by weight or less based on 100 parts by weight of the ethylene-vinyl acetate copolymer. However, when the use amount of the ultraviolet ray-absorbing agent is more than 5 parts by weight, the agent may bleed to the surface of the resulting ethylene-vinyl acetate copolymer resin, and the resin may be poor in the adhesion to the glass.

As the ultraviolet ray-absorbing agent, which does not cause the deterioration of the adhesive force of the ethylene-vinyl acetate copolymer resin to glass and is very small in the yellowing with the lapse of time, there can be particularly advantageously used benzophenone derivatives, such as 2-hydroxy-4-methoxybenzophenone, 2,2'-dihydroxy-4,4'-dimethoxybenzophenone, 2-hydroxy-4-n-dodecyloxybenzophenone, 2,4-dihydroxybenzophenone, 2,2'-dihydroxy-4-methoxybenzophenone, 2-hydroxy-4-n-octoxybenzophenone and the like; benzotriazole derivatives, such as 2-[2'-hydroxy-3'-(3'',4'',5'',6''-tetrahydrophthalimidomethyl)-5'-methylphenyl]benzotriazole, 2-(2'-hydroxy-3',5'-di-t-amylphenyl) benzotriazole; and the like.

Occasionally, in order to improve the stability of the ethylene-vinyl acetate copolymer resin, a polymerization inhibitor, such as hydroquinone, hydroquinone monomethylether, p-benzoquinone, methylhydroquinone or the like, can be added to the ethylenevinyl acetate copolymer resin in an amount of 5 parts by weight or less based on 100 parts by weight of the ethylene-vinyl acetate copolymer. In addition to these polymerization inhibitors, coloring agent, antioxidant, discoloration-preventing agent and the like can be added to the ethylene-vinyl acetate copolymer resin.

The production of the sandwich glass of the present invention by the use of the above described ethylene-vinyl acetate copolymer resin can be carried out in the exactly same manner as carried out in the production of a conventional sandwich glass by the use of polyvinylbutyral resin. That is, the ingredients for the ethylene-vinyl acetate copolymer resin are fully kneaded in a roll mill or the like, and then the resulting homogeneous mixture is formed into a sheet by means of a press or the like. The resulting resin sheet is put between 2 glass plates, and the resulting laminate is gradually heated up to about 80° C., while passing the laminate between several sets of rubber rolls and concurrently pressing the laminate under an increasing pressure, whereby air remaining between the resin sheet and the glass plates is driven off and concurrently the resin sheet is softened and bonded to the glass plates. When the resulting green sandwich glass having an intermediate resin layer, whose resin is present in an incurred state, is heated under pressure in an autoclave, the resin in the resin layer is crosslinked and cured, whereby the resin layer is tightly adhered to the glass plates and is concurrently changed into completely transparent.

In the sandwich glass of the present invention, the resin in the resin layer has been crosslinked and cured, and the resin layer has been very strongly bonded to the glass plates, and hence even when the sandwich glass is exposed to heat and the like, the sandwich glass is free from the formation of bubble, and from the sliding of the glass plates due to the softening of the resin layer. Moreover, even when the sandwich glass is broken by an impact, the resin layer does not peel off from the glass plates, and hence the scattering of the broken glass piece does not substantially occur.

Further, when the sandwich glass of the present invention is used as a show window glass or the like, the sandwich glass is very low in the discoloration, which was caused in a sandwich glass in the early stage of its development, and in the yellowing due to the lapse of time, and hence the color of the merchandise arranged in a show window using the sandwich glass can be observed as such, and the discoloration and fading of the merchandise can be prevented in the case where the merchandise is exposed to the direct sunshine.

The following example is given for the purpose of illustration of this invention and is not intended as a limitation thereof.

EXAMPLE

Preparation of Ethylene-Vinyl Acetate Copolymer Resin Composition

Ingredients for an ethylene-vinyl acetate copolymer resin were homogeneously mixed in a compounding recipe illustrated in the following Table 1 by means of a roll mill to prepare ethylene-vinyl acetate copolymer resin compositions A–H according to the present invention and an ethylene-vinyl acetate copolymer resin composition of Comparative example.

Production of Sandwich Glass

Each of the above obtained resin compositions A–H of the present invention and comparative resin composition was put between 2 polyethylene films and formed into a sheet having a thickness of 0.4 mm by means of a press. The resulting sheet was left to stand to be cooled to room temperature. Then, the polyethylene terephthalate films were peeled off from the resin sheet, and then the resin sheet was put between 2 float glasses, each having a thickness of 3 mm and having been previously cleaned and dried. The resulting laminate was placed in a rubber bag, deaerated under vacuum, and then preliminarily pressed at a temperature of about 80° C. to adhere the resin sheet to the glass plates. Then, the preliminarily pressed and adhered sandwich glass was treated in an autoclave for 20 minutes under a condition of a pressure of 5 kg/cm² and a temperature of 158° C. to cure the resin layer and to produce sandwich glass A–H of the present invention and a sandwich glass of Comparative example.

The following physical property tests were carried out with respect to the above obtained sandwich glasses.

Physical Property Tests a) Dropping ball impact peeling property test

An impact test was effected by a method, wherein a steel ball having a weight of 1,040 g and a smooth surface was dropped by the free fall from a height of 1.2 m on the center portion of each of the above obtained sandwich glasses A–H of the present invention and sandwich glass of Comparative example according to JIS R 3205. In the test, although the glass was broken in all of the sandwich glass A–H of the present invention and the comparative sandwich glass, the steel ball did not penetrate through the sandwich glass, the intermediate resin layer did not crack, and the broken pieces of glass did not substantially scatter.

b) Haze test

The transmittance and haze of each of the sandwich glasses A–H of the present invention and the sandwich glass of Comparative example were measured by means of a color computer SM-III made by Suga Testing Machine Co., Ltd., and the obtained results are shown in the following Table 2.

All of the sandwich glasses A–H of the present invention and the sandwich glass of Comparative example had a high transparency and were free from the optical distortion.

TABLE 2

|   | Transmittance (%) | Haze (%) | Cutting wavelength (nm) |
|---|---|---|---|
| A | 88.9 | 0.5 | 368 |
| B | 89.4 | 0.5 | 400 |
| C | 89.4 | 0.6 | 365 |
| D | 89.7 | 0.6 | 372 |
| E | 89.4 | 0.6 | 402 |
| F | 89.7 | 0.5 | 365 |
| G | 89.5 | 0.5 | 383 |
| H | 88.8 | 0.6 | 387 |
| Comparative example | 89.4 | 0.5 | — | c) Ultraviolet ray-absorbing property test

The UV cutting wavelength of each of the sandwich glasses A–H of the present invention and the sandwich glass of Comparative example was determined from the ultraviolet ray-absorption spectrum of the sandwich glass as illustrated in FIG. 1 attached to this specification, and the obtained results are shown in Table 2.

d) Discoloration test due to heat aging

TABLE 1

|  | Comparative example | A | B | C | D | E | F | G | H |
|---|---|---|---|---|---|---|---|---|---|
| Nipoflex UE-634 (VA cont.: 26%, MI: 4) *1 | 100 | 100 | 100 | 100 | 100 | 100 | 100 | 100 | 100 |
| Perhexa 3M *2 | 2 | 2 | 2 | 2 | 2 | 2 | 2 | 2 | 2 |
| Triallyl isocyanurate | 2 | 2 | 2 | 2 | 2 | 2 | 2 | 2 | 2 |
| γ-Methacryloxypropyl-trimethoxysilane | 0.3 | 0.3 | 0.3 | 0.3 | 0.3 | 0.3 | 0.3 | 0.3 | 0.3 |
| 2-Hydroxy-4-methoxybenzophenone |  | 0.5 |  |  |  |  |  |  |  |
| 2,2'-Dihydroxy-4,4'-dimethoxybenzophenone |  |  | 0.5 |  |  |  |  |  |  |
| 2-Hydroxy-4-n-dodecyloxybenzophenone |  |  |  | 0.5 |  |  |  |  |  |
| 2,4-Dihydroxybenzophenone |  |  |  |  | 0.5 |  |  |  |  |
| 2,2'-Dihydroxy-4-methoxybenzophenone |  |  |  |  |  | 0.5 |  |  |  |
| 2-Hydroxy-4-n-octoxybenzophenone |  |  |  |  |  |  | 0.5 |  |  |
| 2-[2'-hydroxy-3'-(3",4",5",6"-tetrahydrophthalimidomethyl)-5'-methylphenyl]benzotriazole |  |  |  |  |  |  |  | 0.5 |  |
| 2-(2'-hydroxy-3',5'-t-di-amylphenyl)benzotriazole |  |  |  |  |  |  |  |  | 0.5 |

*1 trademark of ethylene-vinyl acetate copolymer sold by Tosoh Corporation
*2 trademark of 1,1-bis(t-butylperoxy)-3,3,5-trimethylcyclohexane sold by Nippon Oil and Fats Co., Ltd.

Each sandwich glass sample, whose haze had been measured, was divided into halves, and one of the halves of the sandwich glass sample was heated for 5 hours in an oven set at 150° C., and then left to stand to be cooled. After the above treated half of the sandwich glass sample was cooled, the treated half and the other half, which had not been subjected to the above treatment, were arranged side by side on a white paper, and yellowing of the sample was observed by the visual observation. Yellowing was not observed in the sample of sandwich glasses A–H of the present invention. However, in the sample of sandwich glass of Comparative example, yellowing was observed.

What is claimed is:

1. An ultraviolet ray-absorbing sandwich glass, comprising two glass plates and a cured resin layer interposed between the glass plates, said sandwich glass having been produced by interposing a thermosetting resin between two glass plates to form a monolithic structure, and thermosetting the resin layer interposed between the glass plates, said thermosetting resin being a homogeneous composition consisting essentially of:
   (1) an ethylene-vinyl acetate copolymer,
   (2) an organic peroxide,
   (3) a member selected from the group consisting of an acryloxy group-containing compound, methacryloxy group-containing compound and allyl group-containing compound,
   (4) a silane coupling agent, and
   (5) 5 parts by weight or less of 2,2'-dihydroxy-4-methoxybenzophenone, based on 100 parts by weight of the ethylene-vinyl acetate copolymer.

2. An ultraviolet ray-absorbing sandwich glass according to claim 1, wherein said ethylene-vinyl acetate copolymer contains 15–50% by weight of vinyl acetate unit.

3. An ultraviolet ray-absorbing sandwich glass according to claim 2, wherein said ethylene-vinyl acetate copolymer contains 19–40% by weight of vinyl acetate unit.

4. An ultraviolet ray-absorbing sandwich glass according to claim 1, wherein said ethylene-vinyl acetate copolymer contains a member of the group consisting of acryloxy group-containing compound, methacryloxy group-containing compound and allyl group-containing compound as a curing aid in an amount of 50% by weight or less based on the amount of the ethylene-vinyl acetate copolymer.

5. An ultraviolet ray-absorbing type sandwich glass according to claim 4, wherein said member is selected from the group consisting of ester and amide of acrylic acid or methacrylic acid.

6. An ultraviolet ray-absorbing sandwich glass according to claim 1, wherein the silane coupling agent is contained in the resin as an adhesive force-improver of the resin to glass in an amount of 5 parts by weight or less based on 100 parts by weight of the ethylenevinyl acetate copolymer.

7. An ultraviolet ray-absorbing type sandwich glass according to claim 1, further comprising 5 parts by weight or less of a polymerization inhibitor selected from the group consisting of hydroquinone, hydroquinone monomethylether, p-benzoquinone and methylhydroquinone based on 100 parts by weight of the ethylene-vinyl acetate copolymer.

* * * * *